United States Patent
Kawai

(10) Patent No.: US 7,791,665 B2
(45) Date of Patent: Sep. 7, 2010

(54) IMAGING APPARATUS AND DRIVING METHOD OF SOLID-STATE IMAGING DEVICE

(75) Inventor: Shinichi Kawai, Miyagi (JP)

(73) Assignee: Fujifilm Corporation, Tokyo (JP)

(*) Notice: Subject to any disclaimer, the term of this patent is extended or adjusted under 35 U.S.C. 154(b) by 645 days.

(21) Appl. No.: 11/785,204

(22) Filed: Apr. 16, 2007

(65) Prior Publication Data

US 2007/0242148 A1 Oct. 18, 2007

(30) Foreign Application Priority Data

Apr. 17, 2006 (JP) ............ P.2006-113643

(51) Int. Cl.
H04N 3/15 (2006.01)
H04N 5/235 (2006.01)

(52) U.S. Cl. .................. 348/315; 348/229.1

(58) Field of Classification Search .......... 348/311, 348/362, 229.1, 315
See application file for complete search history.

(56) References Cited

U.S. PATENT DOCUMENTS

| | | | |
|---|---|---|---|
| 6,784,935 B1 | 8/2004 | Uya et al. | |
| 6,929,972 B2* | 8/2005 | Takeuchi et al. | 438/70 |
| 7,430,011 B2* | 9/2008 | Xu et al. | 348/362 |
| 2003/0001962 A1* | 1/2003 | Sakurai | 348/362 |
| 2004/0096124 A1* | 5/2004 | Nakamura | 348/308 |
| 2004/0145672 A1 | 7/2004 | Sugimoto | |
| 2008/0136948 A1* | 6/2008 | Muramatsu | 348/294 |

FOREIGN PATENT DOCUMENTS

| | | |
|---|---|---|
| JP | 2000-138868 A | 5/2000 |
| JP | 2004-222184 A | 8/2004 |

* cited by examiner

Primary Examiner—Jason Whipkey
(74) Attorney, Agent, or Firm—Birch, Stewart, Kolasch & Birch, LLP

(57) ABSTRACT

A driving method of a solid-state imaging device including plural high-sensitivity pixels and plural low-sensitivity pixels that are arranged in mixed form in a manner of a two-dimensional array on a semiconductor substrate, the method including driving the solid-state imaging device in such a manner that an exposure period of the low-sensitivity pixels is set shorter than that of the high-sensitivity pixels.

8 Claims, 4 Drawing Sheets

IMAGING APPARATUS AND DRIVING METHOD OF SOLID-STATE IMAGING DEVICE

FIELD OF THE INVENTION

The present invention relates to an imaging apparatus and a driving method of a solid-state imaging device which are able to take an image having a wide dynamic range.

BACKGROUND OF THE INVENTION

Taking an object image with a digital camera has a problem that the dynamic range of the image taken is narrower than in the case of using a silver-salt film camera. To solve this problem, in the digital camera disclosed in JP-A-2000-138868 (corresponding to U.S. Pat. No. 6,784,935), an image having a wide dynamic range is taken by combining first image data obtained through shooting with long-term exposure and image data obtained immediately thereafter through shooting with short-term exposure.

In the digital camera disclosed in JP-A-2004-222184 (US 2004/0145672 A1), a half of a large number of photoelectric conversion elements (pixels; arranged like a two-dimensional array) of a solid-state imaging device are large-area, high-sensitivity elements and the other half are small-area, low-sensitivity elements. The dynamic range of an image taken is increased by combining an image produced by the high-sensitivity elements and an image produced by the low-sensitivity elements.

SUMMARY OF THE INVENTION

The above-described conventional techniques can increase the dynamic range of an image taken. However, there still exists a great demand for taking of images having even wider dynamic ranges with digital cameras.

The conventional technique of JP-A-2004-222184 (US 2004/0145672 A1) has the following problem. When an object image in which the luminance difference between a high-luminance portion and a low-luminance portion is small is taken, image data produced by the low-sensitivity elements make almost no contribution and hence the low-sensitivity elements, which were incorporated elaborately, are useless.

An object of the present invention is to provide an imaging apparatus and a driving method of a solid-state imaging device which are able to take an image having a wide dynamic range and in which low-sensitivity elements are not rendered useless.

The invention provides a driving method of a solid-state imaging device having plural high-sensitivity pixels and plural low-sensitivity pixels that are arranged in mixed form like a two-dimensional array on a semiconductor substrate, characterized by driving the solid-state imaging device in such a manner that an exposure period of the low-sensitivity pixels is set shorter than that of the high-sensitivity pixels.

The driving method of a solid-state imaging device according to the invention is also characterized in that a pixel area of the high-sensitivity pixels is wider than that of the low-sensitivity pixels.

The driving method of a solid-state imaging device according to the invention is also characterized by shortening the exposure period of the low-sensitivity pixels if a bright/dark difference α of an object image is large, and elongating the exposure period of the low-sensitivity pixels if the bright/dark difference α is small.

The invention provides an imaging apparatus characterized by comprising a solid-state imaging device having plural high-sensitivity pixels and plural low-sensitivity pixels that are arranged in mixed form like a two-dimensional array on a semiconductor substrate; and a control unit for driving the solid-state imaging device in such a manner that an exposure period of the low-sensitivity pixels is set shorter than that of the high-sensitivity pixels, and for combining second image data produced by the low-sensitivity pixels with first image data produced by the high-sensitivity pixels to generate composed image data having a wider dynamic range than the first image data.

The imaging apparatus according to the invention is also characterized in that a pixel area of the high-sensitivity pixels is wider than that of the low-sensitivity pixels.

The control unit of the imaging apparatus according to the invention is characterized by shortening the exposure period of the low-sensitivity pixels if a bright/dark difference α of an object image is large, and elongating the exposure period of the low-sensitivity pixels if the bright/dark difference α is small.

The control unit of the imaging apparatus according to the invention is characterized by comparing the bright/dark difference α with a prescribed threshold value, generating composed image data having a wider dynamic range than the first image data if the bright/dark difference α is larger than the prescribed threshold value, and elongating the exposure period of the low-sensitivity pixels to decrease a sensitivity difference from the high-sensitivity pixels and generating high-resolution image data using image data read from the high-sensitivity pixels and image data read from the low-sensitivity pixels if the bright/dark difference α is smaller than the prescribed threshold value.

The imaging apparatus according to the invention is also characterized by further comprising an input unit for receiving an external instruction as to whether to compose image data having a wider dynamic range than the first image data or generate high-resolution image data, instead of comparing the bright/dark difference α with the prescribed threshold value.

The invention makes it possible to take an image having a wider dynamic range than in conventional cases. Furthermore, low-sensitivity pixels are not rendered useless even in taking an image having a small luminance difference.

DESCRIPTION OF SYMBOLS

Figure 1:
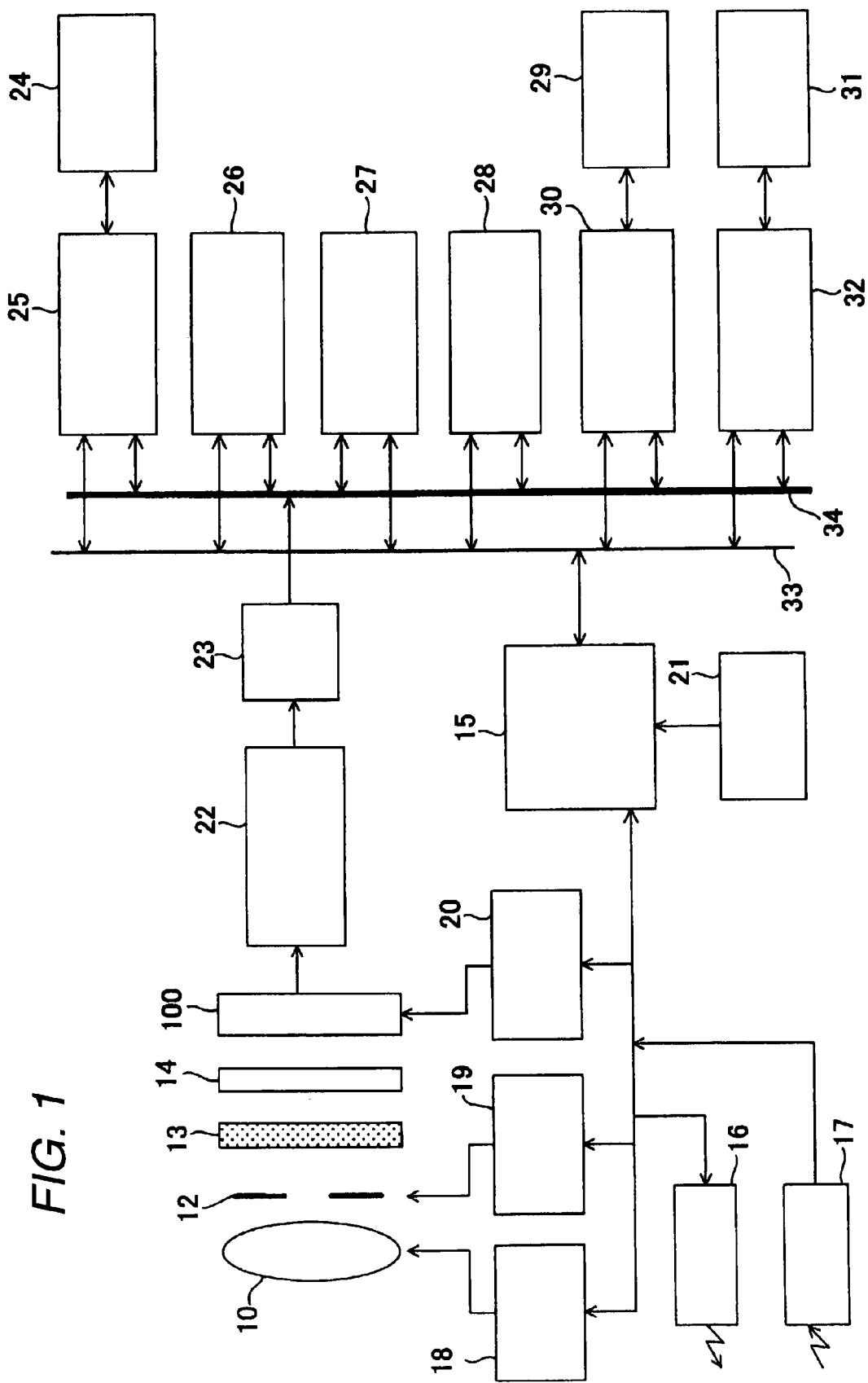
FIG. 1 is a functional block diagram of a digital camera according to an embodiment of the present invention.

10: Imaging lens
15: CPU for unified control
20: Imaging device driving section
21: Manipulating section
26: Digital signal processing section
100: Solid-state imaging device
102$a$: High-sensitivity elements (large-area photodiode)
102$b$: Low-sensitivity elements (small-area photodiode)

103: Vertical charge transfer channel (VCCD)
104: Read gate
105: Horizontal charge transfer channel (HCCD)

DETAILED DESCRIPTION OF THE INVENTION

An embodiment of the present invention will be hereinafter described with reference to the drawings.

FIG. 1 shows the configuration of a digital camera according to the embodiment of the invention. The illustrated digital camera is equipped with an imaging lens 10, a CCD solid-state imaging device 100 (described later in detail), a stop 12 disposed between them, an infrared cutting filter 13, and an optical lowpass filter 14. A CPU (control unit) 15, which controls the entire digital camera in a unified manner, controls a flashing section 16 and a photodetecting section 17, adjusts the position of the imaging lens 10 so that it is located at a focusing position by controlling a lens driving section 18, and adjusts the exposure amount by controlling the aperture of the stop 12 via a stop driving section 19.

The CPU 15 causes an imaging device driving section 20 to output an electronic shutter pulse, a read pulse, a transfer pulse, etc. and thereby causes the solid-state imaging device 100 to output, in the form of color signals, an object image taken through the imaging lens 10. A user's instruction is input to the CPU 15 via a manipulating section (instruction input unit) 21, and the CPU 15 performs various controls according to the instruction.

The electric control system of the digital camera is provided with an analog signal processing section 22 which is connected to the output of the solid-state imaging device 100 and an A/D conversion circuit 23 which converts RGB color signals that are output from the analog signal processing section 22 into digital signals. The analog signal processing section 22 and the A/D conversion circuit 23 are controlled by the CPU 15.

The electric control system of the digital camera is also provided with a memory control section 25 which is connected to a main memory (frame memory) 24, a digital signal processing section 26 which performs a gamma correction calculation, RGB/YC conversion processing, etc., a compression/expansion processing section 27 which compresses an image taken into a JPEG image and expands a compressed image, an integrating section 28 which integrates photometric data and determines a gain of a white balance correction which is performed by the digital signal processing section 26, an external memory control section 30 to which a detachable recording medium 29 is connected, and a display control section 32 to which a liquid crystal display unit 31 mounted on the back side, for example, of the camera is connected. The above sections are connected to each other via a control bus 33 and a data bus 34 and controlled according to commands from the CPU 15.

Figure 2:
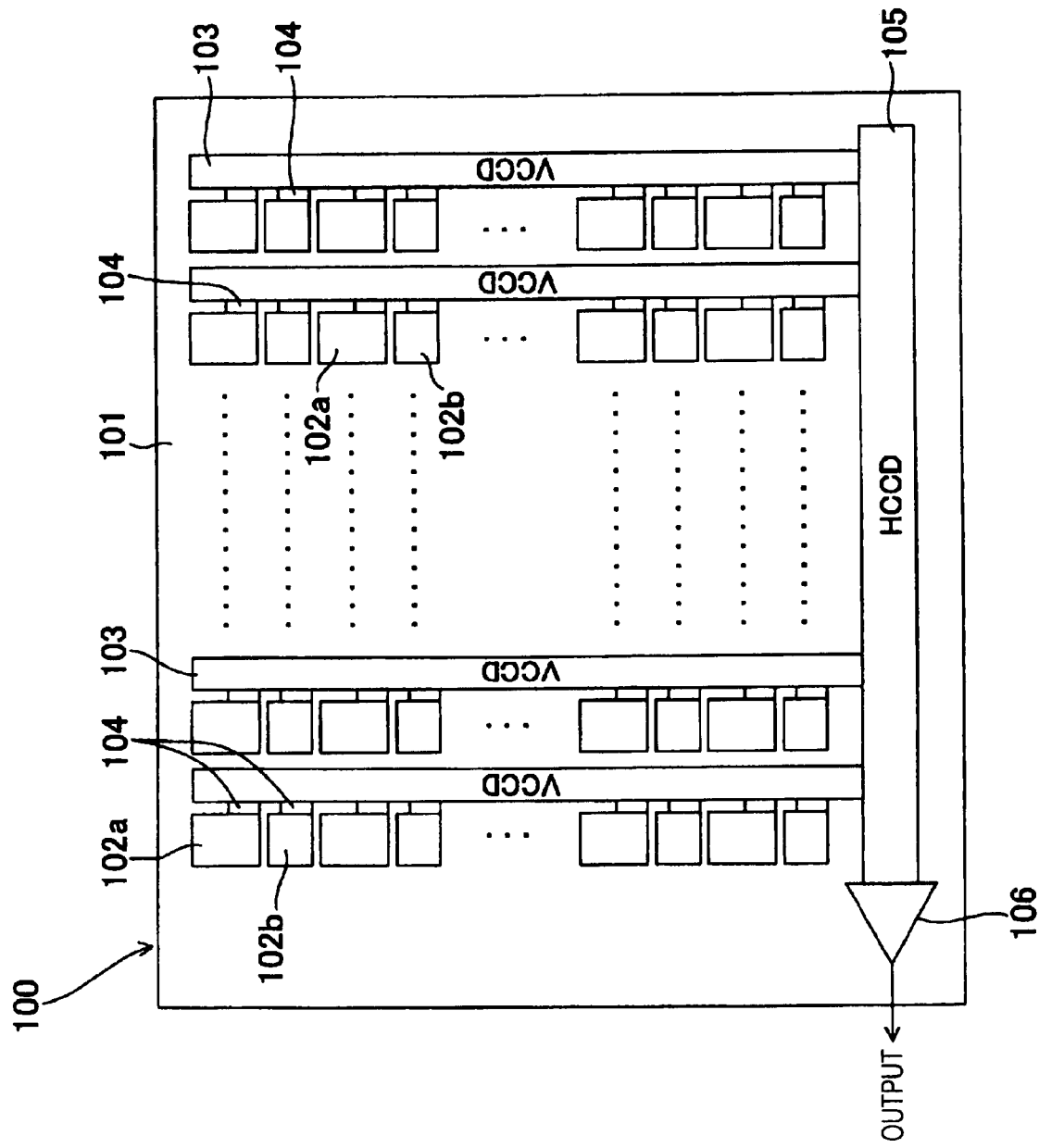
FIG. 2 is a schematic plan view of a solid-state imaging device shown in FIG. 1.

FIG. 2 is a schematic plan view of the solid-state imaging device 100 shown in FIG. 1. As shown in FIG. 2, a large number of photodiodes (photoelectric conversion elements, pixels) 102a and 102b are arranged in a square lattice form on a semiconductor substrate 101 of the solid-state imaging device 100.

The photodiodes 102a and the photodiodes 102b are different from each other in photodetecting area: the photodetecting area of the photodiodes 102b is smaller than that of the photodiodes 102a. Therefore, the photodiodes 102a which are relatively of a large area serve as high-sensitivity elements (high-sensitivity pixels) and the photodiodes 102b which are relatively of a small area serve as low-sensitivity elements (low-sensitivity pixels). The high-sensitivity elements 102a and the low-sensitivity elements 102b are arranged alternately in mixed form in the photodetecting area of the semiconductor substrate 101.

A vertical charge transfer channel (VCCD) 103 which is a vertically extending charge-coupled device (CCD) is disposed beside each photodiode column formed on the semiconductor substrate 101. Each of the photodiodes 102a and 102b constituting each photodiode column is connected to the associated vertical charge transfer channel 103 via a read gate 104.

A horizontal charge transfer channel (HCCD) 105 is disposed adjacent to and parallel with the bottom sideline of the semiconductor substrate 101 so as to be adjacent to the bottom ends of the respective vertical charge transfer channels 103. An output amplifier 106 is disposed at the output end of the horizontal charge transfer channel 105.

The operation of the above-configured CCD solid-state imaging device 100 is well known and will be outlined first. When pulses are applied to the read gates 104 from the imaging device driving section 20 shown in FIG. 1 after exposure of the photodiodes 102 and accumulation of signal charges, the signal charges of the photodiodes 102 are read into the potential wells of the vertical charge transfer channel 103 via the read gates 104.

As the imaging device driving section 20 outputs vertical transfer pulses to the solid-state imaging device 100, the signal charges in the vertical charge transfer channel 103 are transferred toward and moved to the horizontal charge transfer channel 105. The horizontal charge transfer channel 105 is driven by horizontal transfer pulses that are output from the imaging device driving section 20, and the amplifier 106 outputs a voltage signal corresponding to the amount of a signal charge that has been transferred to the output end of the horizontal charge transfer channel 105.

The terms "vertical" and "horizontal" as used above refer to one direction and a direction approximately perpendicular to the one direction, respectively, on the surface of the semiconductor substrate 101.

Figure 3:
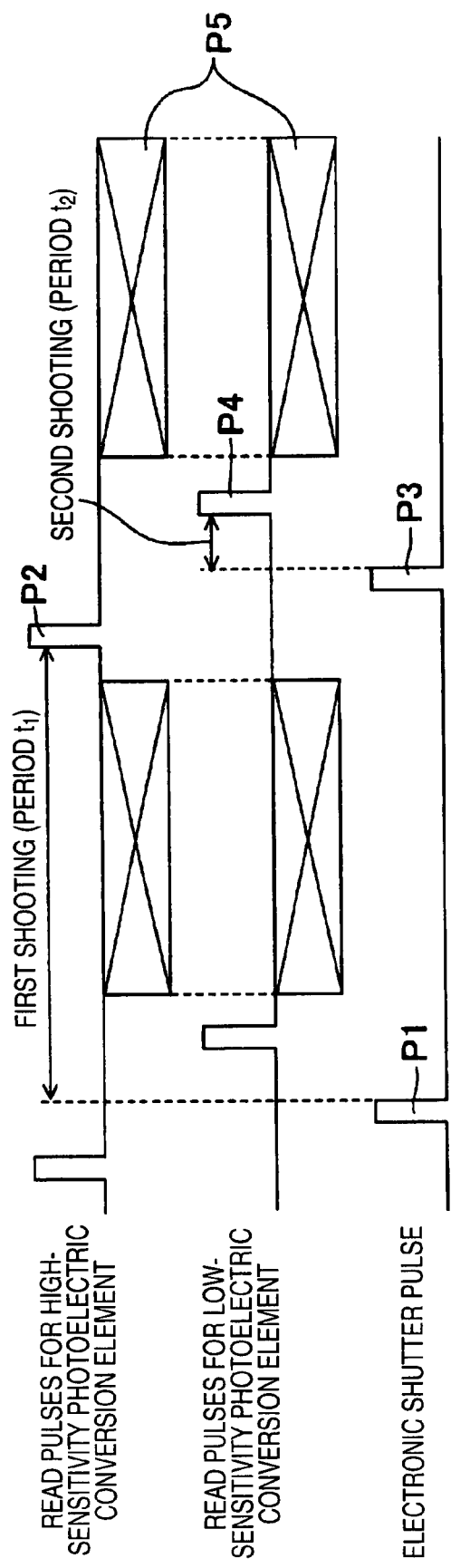
FIG. 3 is a timing chart showing a method by which an imaging device driving section shown in FIG. 1 drives the solid-state imaging device.

FIG. 3 is a timing chart showing a detailed driving method of the solid-state imaging device 100 according to the embodiment. The illustrated example corresponds to a case of taking still images sequentially. When the imaging device driving section 20 outputs an electronic shutter pulse P1 to the solid-state imaging device 100, the electronic shutter pulse voltage is applied to the semiconductor substrate 101, whereupon residual charges in the high-sensitivity elements 102a and the low-sensitivity elements 102b are discarded to the substrate 101 side and the high-sensitivity elements 102a and the low-sensitivity elements 102b become empty.

Exposure of the high-sensitivity elements 102a and the low-sensitivity elements 102b is started from the timing of the fall of the electronic shutter pulse P1, and signal charges (in this example, electrons) are accumulated. When a read pulse P2 is applied to the read gates 104 of the high-sensitivity elements 102a from the imaging device driving section 20, an exposure period t1 (first shooting) using the high-sensitivity elements 102a is finished and signal charges of the high-sensitivity elements 102a are moved to and held by the potential wells of the vertical charge transfer channels 103.

When an electronic shutter pulse P3 is thereafter applied to the semiconductor substrate 101 from the imaging device driving section 20, residual charges in the high-sensitivity elements 102a and the low-sensitivity elements 102b are discarded to the substrate 101 side and the high-sensitivity elements 102a and the low-sensitivity elements 102b become empty. At this time, the signal charges in the vertical charge transfer channels 103 are held as they are.

Exposure of the high-sensitivity elements 102a and the low-sensitivity elements 102b is started from the timing of the fall of the electronic shutter pulse P3, and signal charges are accumulated. When a read pulse P4 is thereafter applied to the read gates 104 of the low-sensitivity elements 102b, an exposure period t2 (second shooting) using the low-sensitivity elements 102b is finished and signal charges of the low-sensitivity elements 102b are moved to and held by the potential wells of the vertical charge transfer channels 103. In the solid-state imaging device 100 shown in FIG. 2, the signal charges produced by the high-sensitivity elements 102a and the signal charges produced by the low-sensitivity elements 102b are arranged alternately in each vertical charge transfer channel 103.

Then, as vertical transfer pulses P5 are applied to the vertical charge transfer channels 103 from the imaging device driving section 20, the signal charges produced by the high-sensitivity elements 102a and the signal charges produced by the low-sensitivity elements 102b in the vertical charge transfer channels 103 are transferred toward the horizontal charge transfer channel 105, whereby a voltage signal reflecting the amount of each signal charge is output from the amplifier 106 to the analog signal processing section 22 shown in FIG. 1 in the above-described manner.

Figure 4:
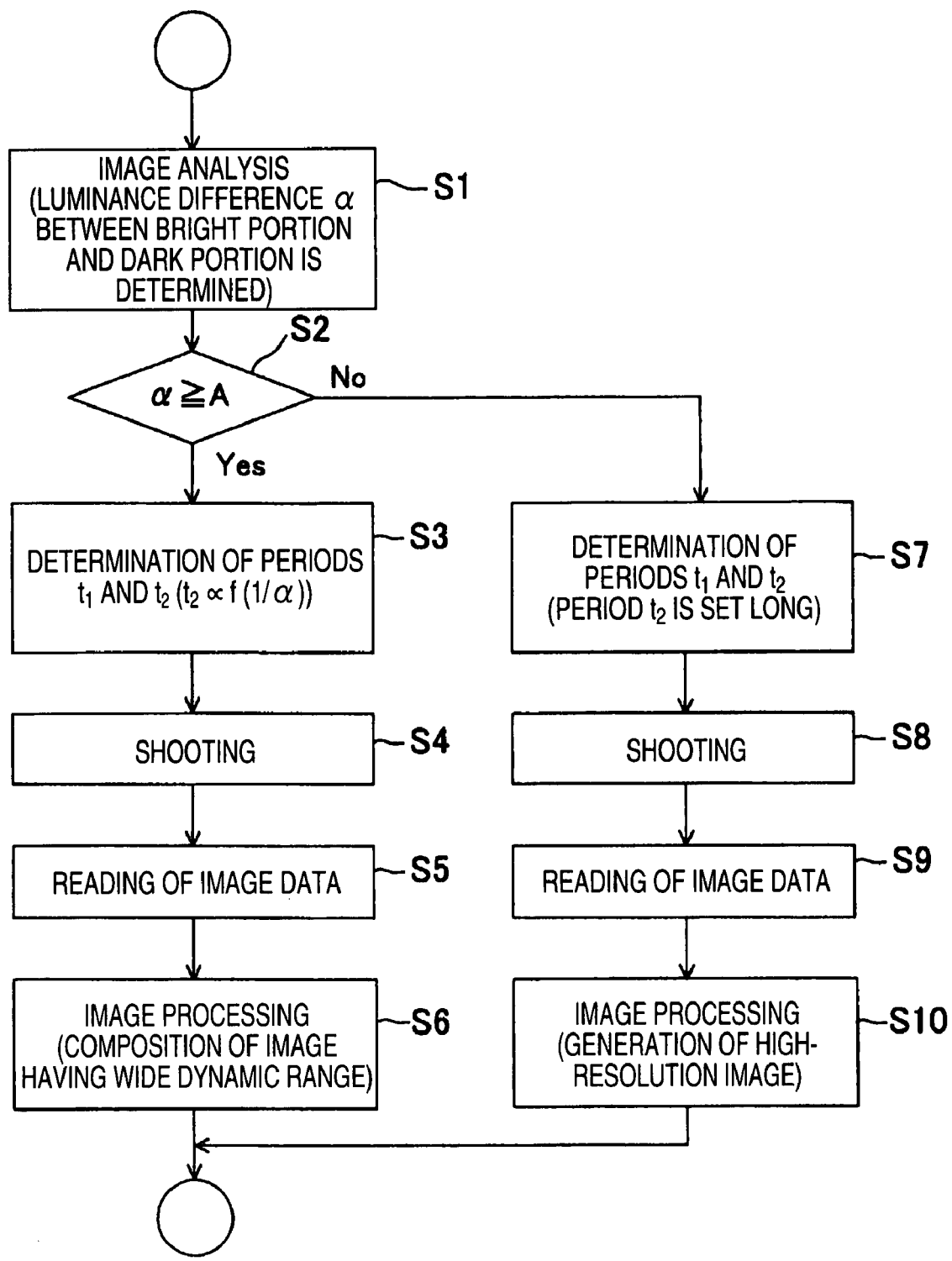
FIG. 4 is a flowchart of an imaging procedure that a CPU for unified control shown in FIG. 1 follows.

FIG. 4 is a flowchart of an imaging procedure that the CPU 15 shown in FIG. 1 follows. Before taking of a still image, object image data are output sequentially from the solid-state imaging device 100 in moving image form and the signal processing section 26 performs signal processing on each set of object image data. The CPU 15 receives an analysis result of a signal-processed object image from the digital signal processing section 26 and determines a luminance difference $\alpha$ between a bright portion and a dark portion (step S1).

Then, the CPU 15 judges whether or not the luminance difference $\alpha$ is larger than or equal to a prescribed threshold value A (step S2). In the case of an image having a large bright/dark difference (i.e., the luminance difference $\alpha$ is larger than or equal to the prescribed value A), it is necessary to produce an object image having a wide dynamic range. Therefore, the CPU 15 moves to step S3, where the exposure periods $t_1$, and $t_2$ which were described above with reference to FIG. 3 are determined.

The exposure periods $t_1$, and $t_2$ are determined on the basis of information acquired by the photodetecting section 17 shown in FIG. 1 and an aperture and an exposure amount that have been determined on the basis of object image data obtained in moving image form. The exposure period $t_2$ of the low-sensitivity elements 102b is determined further on the basis of the first exposure period $t_1$, etc. so as to be proportional to the reciprocal of the luminance difference $\alpha$, that is, $1/\alpha$.

In the case of an object having a large bright/dark difference (i.e., the luminance difference $\alpha$ is larger than or equal to the prescribed value A), signals produced by the low-sensitivity elements 102b make a greater contribution to a bright portion of a combined image than signals produced by the high-sensitivity elements 102a. Conversely, the signals produced by the low-sensitivity elements 102b make a smaller contribution to a dark portion than the signals produced by the high-sensitivity elements 102a.

In view of the above, when the bright/dark difference is large, the exposure period $t_2$ is set short so that the low-sensitivity elements 102b will not be saturated (high-sensitivity elements 102a that are involved in shooting of the bright portion will be saturated at a high probability). When the bright/dark difference is small, the exposure period $t_2$ is set long.

At the next step S4, shooting (first shooting and second shooting described above with reference to FIG. 3) is performed upon depression of the release button. At step S5, image data produced by the high-sensitivity elements 102a and image data produced by the low-sensitivity elements 102b are output from the solid-state imaging device 100.

At step S6, the CPU 15 causes the digital signal processing section 26 to perform signal processing on the image data produced by the high-sensitivity elements 102a and image processing on the image data produced by the low-sensitivity elements 102b and to perform processing of combining the two sets of image data. The process of FIG. 4 is then finished. Combining processing methods conventionally used (e.g., the method disclosed in JP-A-2004-222184 (US 2004/0145672 A1)) can be employed in this combining processing.

In the digital camera disclosed in JP-A-2004-222184 (US 2004/0145672 A1), high-sensitivity image data and low-sensitivity image data produced by exposing the high-sensitivity elements and the low-sensitivity elements simultaneously for the same period. In contrast, in this embodiment, the exposure period of the low-sensitivity elements is set short, which makes it possible to compose an image having a wider dynamic range than the digital camera disclosed in JP-A-2004-222184 (US 2004/0145672 A1).

In the case of an object having a small bright/dark difference (i.e., the luminance difference $\alpha$ is smaller than the prescribed value A), a bright portion and a dark portion can be discriminated from each other by using only signal charges produced by the high-sensitivity elements 102a. However, in this case, the low-sensitivity elements 102b are useless if signals produced by the low-sensitivity elements 102b are not used.

In view of the above, in the digital camera according to the embodiment, if the judgment result of step S2 is $\alpha<A$, the CPU 15 moves from step S2 to step S7, where the exposure period $t_2$ is set long.

The sensitivity difference between the high-sensitivity elements 102a and the low-sensitivity elements 102b is attained by their area difference to enable composition of an image having a wide dynamic range. However, at step S7, the exposure period $t_2$ is set so that the sensitivity difference between the high-sensitivity elements 102a and the low-sensitivity elements 102b is reduced.

The example of FIG. 3 is such that the short exposure period $t_2$ is set after the exposure period $t_1$. Alternatively, the sensitivity of the elements 102b may be made equal to that of the elements 102a by causing the exposure period $t_2$ to start simultaneously with the exposure period $t_1$ and ends after the exposure period $t_1$.

Shooting is performed at the next step S8, signals are output from the solid-state imaging device 100 at step S9, and image processing is performed at step S10. The process of FIG. 4 is then finished.

The image processing of step S10 employ different signal processing than that of step S6. In the image composition processing of step S6, the dynamic range of signals produced by the high-sensitivity elements 102a is increased by using signals produced by the low-sensitivity elements 102b. The resolution of a composed image is determined by the number of high-sensitivity elements 102a shown in FIG. 2 and hence is a half of the resolution determined by the number of pixels on the semiconductor substrate 101.

In contrast, in the image processing of step S10, the exposure period $t_2$ is elongated to cancel out the sensitivity difference between the elements 102a and the elements 102b which corresponds to their area ratio. Therefore, signals produced by the elements 102a and signals produced by the elements 102b are handled equally, whereby image data having a high resolution that corresponds to the number of pixels on the semiconductor substrate 101 are generated.

Where the ratio of the area of the elements 102a to that of the elements 102b is large, the sensitivities of the elements 102a and the elements 102b cannot be equalized unless the exposure period $t_2$ is set very long. In such a case, the exposure period $t_2$ is elongated to a certain extent and a portion short of the intended sensitivity is compensated for by amplifying signals produced by the elements 102b.

The above-described embodiment allows the digital camera incorporating the solid-state imaging device having the high-sensitivity elements and the low-sensitivity elements to take an image having a wider dynamic range than conventional digital cameras do, as well as to take a high-resolution image of an object having a small bright/dark difference.

In the above-described embodiment, the sensitivity difference between the high-sensitivity elements 102a and the low-sensitivity elements 102b due to their pixel area difference is attained by the difference between their element areas (i.e., photodiode areas). Alternatively, the pixel areas may be made different by producing a difference in the area of microlenses that are laid on the photodiodes while making the photodiode areas identical. As a further alternative, the sensitivity difference may be attained by producing a pixel area difference by presence/absence of the microlenses.

At step S2 of the above embodiment, whether to take a wide-dynamic-range image or a high-resolution image is determined automatically by using the luminance difference α and the prescribed threshold value A. It is also possible to determine whether to take a wide-dynamic-range image or a high-resolution image on the basis of an instruction that is input by a user through the manipulating section 21.

Providing an advantage that the dynamic range of an image taken can be made wider than in conventional cases, the invention is useful when applied to digital cameras etc.

This application is based on Japanese Patent application JP 2006-113643, filed Apr. 17, 2006, the entire content of which is hereby incorporated by reference, the same as if set forth at length.

What is claimed is:

1. A driving method of a solid-state imaging device including plural high-sensitivity pixels and plural low-sensitivity pixels that are arranged in mixed form in a manner of a two-dimensional array on a semiconductor substrate, the method comprising:
driving the solid-state imaging device in such a manner that an exposure period of the low-sensitivity pixels is set shorter than that of the high-sensitivity pixels,
wherein the exposure period of the low-sensitivity pixels is shortened to increase a difference between the exposure periods of the low-sensitivity pixels and the high-sensitivity pixels in case a bright/dark difference of an object image is large, and the exposure period of the low-sensitivity pixels is elongated to decrease a difference between the exposure periods of the low-sensitivity pixels and the high-sensitivity pixels in case the bright/dark difference is small.

2. The driving method according to claim 1, wherein a pixel area of the high-sensitivity pixels is wider than that of the low-sensitivity pixels.

3. An imaging apparatus comprising:
a solid-state imaging device including plural high-sensitivity pixels and plural low-sensitivity pixels that are arranged in mixed form in a manner of a two-dimensional array on a semiconductor substrate; and
a control unit which drives the solid-state imaging device in such a manner that an exposure period of the low-sensitivity pixels is set shorter than that of the high-sensitivity pixels, and combines second image data produced by the low-sensitivity pixels with first image data produced by the high-sensitivity pixels to generate composed image data having a wider dynamic range than the first image data,
wherein the control unit shortens the exposure period of the low-sensitivity pixels in case a bright/dark difference of an object image is large in order to increase a difference between the exposure periods of the low-sensitivity pixels and the high-sensitivity pixels, and elongates the exposure period of the low-sensitivity pixels in case the bright/dark difference is small in order to decrease a difference between the exposure periods of the low-sensitivity pixels and the high sensitivity pixels.

4. The imaging apparatus according to claim 3, wherein a pixel area of the high-sensitivity pixels is wider than that of the low-sensitivity pixels.

5. The imaging apparatus according to claim 4, wherein the control unit compares the bright/dark difference with a threshold value, generates composed image data having a wider dynamic range than the first image data in case the bright/dark difference is larger than the threshold value, and elongates the exposure period of the low-sensitivity pixels to decrease a sensitivity difference from the high-sensitivity pixels and generates high-resolution image data using image data read from the high-sensitivity pixels and image data read from the low-sensitivity pixels in case the bright/dark difference is smaller than the threshold value.

6. The imaging apparatus according to claim 4, further comprising an input unit which receives an external instruction as to whether to compose image data having a wider dynamic range than the first image data or generate high-resolution image data.

7. The imaging apparatus according to claim 3, wherein the control unit compares the bright/dark difference with a threshold value, generates composed image data having a wider dynamic range than the first image data in case the bright/dark difference is larger than the threshold value, and elongates the exposure period of the low-sensitivity pixels to decrease a sensitivity difference from the high-sensitivity pixels and generates high-resolution image data using image data read from the high-sensitivity pixels and image data read from the low-sensitivity pixels in case the bright/dark difference is smaller than the threshold value.

8. The imaging apparatus according to claim 3, further comprising an input unit which receives an external instruction as to whether to compose image data having a wider dynamic range than the first image data or generate high-resolution image data.

* * * * *